US012807494B2

(12) United States Patent
Burchak et al.

(10) Patent No.: US 12,807,494 B2
(45) Date of Patent: Nov. 24, 2026

(54) PROCESS FOR THE PRODUCTION OF SILICON-CARBON COMPOSITE MATERIALS

(71) Applicant: ENWIRES, Montbonnot-Saint-Martin (FR)

(72) Inventors: Olga Burchak, Domène (FR); Pierre Lassegue, Domène (FR)

(73) Assignee: ENWIRES, Montbonnot-Saint-Martin (FR)

( * ) Notice: Subject to any disclaimer, the term of this patent is extended or adjusted under 35 U.S.C. 154(b) by 469 days.

(21) Appl. No.: 18/563,965

(22) PCT Filed: May 20, 2022

(86) PCT No.: PCT/EP2022/063683
§ 371 (c)(1),
(2) Date: Nov. 24, 2023

(87) PCT Pub. No.: WO2022/248347
PCT Pub. Date: Dec. 1, 2022

(65) Prior Publication Data

US 2024/0239662 A1 Jul. 18, 2024

(30) Foreign Application Priority Data

May 28, 2021 (EP) .................................... 21305712

(51) Int. Cl.
*C01B 32/05* (2017.01)
*H01M 4/587* (2010.01)
*H01M 10/052* (2010.01)

(52) U.S. Cl.
CPC ............. *C01B 32/05* (2017.08); *H01M 4/587* (2013.01); *H01M 10/052* (2013.01); *C01P 2004/02* (2013.01); *C01P 2004/64* (2013.01); *C01P 2004/80* (2013.01); *C01P 2006/40* (2013.01)

(58) Field of Classification Search
None
See application file for complete search history.

(56) References Cited

U.S. PATENT DOCUMENTS

| | | | |
|---|---|---|---|
| 2011/0309306 | A1 | 12/2011 | Zhou et al. |
| 2014/0045060 | A1 | 2/2014 | Park et al. |
| 2014/0154564 | A1 | 6/2014 | Yoo et al. |

FOREIGN PATENT DOCUMENTS

| | | | |
|---|---|---|---|
| CN | 103764544 | A | 4/2014 |
| CN | 105185970 | A | 12/2015 |
| CN | 106848268 | A | 6/2017 |
| JP | 2020-514231 | A | 5/2020 |
| WO | 2013/016339 | A2 | 1/2013 |
| WO | 2018/013991 | A2 | 1/2018 |
| WO | 2018165610 | A1 | 9/2018 |

(Continued)

OTHER PUBLICATIONS

Aug. 5, 2022 International Search Report issued in International Patent Application No. PCT/EP2022/063683.

(Continued)

*Primary Examiner* — Colin W. Slifka
(74) *Attorney, Agent, or Firm* — Oliff PLC

(57) ABSTRACT

A process for the preparation of a carbon-silicon composite material having carbon-based material and silicon nanomaterials, wherein the process is implemented in a rotating tubular chamber of a reactor.

19 Claims, 8 Drawing Sheets

(56) References Cited

FOREIGN PATENT DOCUMENTS

WO 2020128495 A1 6/2020

OTHER PUBLICATIONS

Brust et al., "Synthesis of Thiol-derivatised Gold Nanoparticles in a Two-phase Liquid-Liquid System", Journal of Chemical Society, Chemical Communications, 1994, vol. 7, No. 7, pp. 801-802.
Liu et al., "Large-Scale Production of a Silicon Nanowire/Graphite Composites Anode via the CVD Method for High-Performance Lithium-Ion Batteries", Energy Fuels, 2021, vol. 35, No. 3, pp. 2758-2765.
Chan et al., "High-performance lithium battery anodes using silicon nanowires", Nature Nanotechnology, Jan. 2008, vol. 3, pp. 31-35.
Jun. 19, 2025 Search Report issued in Chinese Patent Application No. 202280038260.0.
Jun. 20, 2025 Office Action issued in Chinese Patent Application No. 202280038260.0.
May 12, 2026 Office Action issued in Japanese Patent Application No. 2023-573357.

PROCESS FOR THE PRODUCTION OF SILICON-CARBON COMPOSITE MATERIALS

The invention is directed to a process for the preparation of a composite carbon-silicon material comprising carbon-based material and silicon nanomaterials, especially nanowires or nano-isles, said process being carried out in the tubular chamber of a rotating reactor at a pressure superior to atmospheric pressure. The invention is also directed to a method for making electrodes for lithium-ion batteries.

STATE OF THE ART

Since its commercial introduction in 1991, Li-ion battery (LIB) technology is constantly improving its ability to store energy. But new LIB generations require more energy density at given battery volume (kWh/L) and lower price ($/KWh), especially for electric vehicle application. Current battery active materials (both for anode and cathode parts) have already reached their theoretical limits, and battery manufacturers need more efficient materials to meet market requests.

Graphite, currently used as almost exclusive anode material, is the weak link in a battery, taking up more space than any other component. Several anode materials with improved storage capacity have been developed during the two last decades. Among them, silicon (Si) is the most promising candidate as novel anode material as it can store almost 10 times more energy than graphite. In parallel with high theoretical specific capacity, silicon possesses a high volumetric expansion that results in poor stability during lithiation and delithiation.

Silicon nanowires (SiNWs) are excellent candidates for LIB anode materials in terms of specific capacity and cycle life as SiNWs exhibit a perfect strain and volume accommodation property. Cui et al., Nature Nanotechnology, 2008, 31-35, have disclosed high-performance lithium battery anodes using silicon nanowires grown directly on current collector. However, this new electrode technology requires serious efforts from battery manufacturers to match it with current cell production lines. In contrast, the co-utilization of silicon nanowires and graphite/carbon could be one of the preferred strategies as a fully "drop-in solution". Industrial fabrication at acceptable price of such composites is an important challenge for battery market.

Different techniques for SiNWs production are categorized mainly in two synthetic approaches: bottom-up (nanowire growth from elemental silicon) and top-down (etching of bulk silicon). Top-down approach is characterized by considerable waste of starting silicon and inevitable use of hazardous chemicals. Bottom-up technique is generally based on chemical vapor deposition (CVD) that can produce high quality nanowires.

Current "fix-bed" CVD equipment for SiNWs growth result in limited contact between a 2D surface decorated by metallic nanoseeds and a gas precursor and thus only small quantities can be produced, insufficient for responding to market requests.

Several attempts have been performed to use vertical "fluidized-bed" CVD reactors for SiNWs synthesis to increase the contact surface in 3D format (for instance, US 2011/0309306). Unfortunately, the utilization of classical "fluidized-bed" CVD reactors shows very limited technical and economic feasibility at industrial scale due to 1/the decrease of volumetric productivity (product mass per reactor volume) when the production scale increases 2/the handling of extremely large volumes of reactant/carrier gas and complex, thus costly separation of gases and nano- and micro-sized objects at industrial scale.

WO 2018/013991 discloses the production of carbon-SiNW composite material in a mechanical, rotating type, fluidized-bed reactor that can be used in a batch or semi-continuous mode. The process is based on the use of tumblers filled with the carbon-based material. The process is achieved under low pressure. The method gives access to the material on the kilogram scale, said material comprising up to 32 Si % by mass. The method is flawed by some major limitations: the reaction zone of the CVD chamber is restricted by the reduced size of the tumblers; rails, gas inputs, gas outputs, and gears systems, pressure regulation devices needed to connect and control the tumbler(s) result in a complex device from the technical, procedural, and economic point-of-view. The systems are equipped with cyclones to collect elutriated particles greater than 5 μm in size, thus limiting the range of powders that can be used in the process.

Another example of carbon-SiNW composite materials production was recently reported (Energy&Fuels, 2021, 35, 2758-2765). The authors demonstrated a possibility to use a simple rotating furnace to produce SiNWs/graphite composite from chloromethylsilane and graphite powder. Under the reported conditions, an important part of silicon/graphite composite is lost during the reaction. In addition to the low yields, one inconvenient is that gas-solid separation devices are necessary at the exhaust of the gas line (filters and/or cyclones) for an industrial version of the method.

WO2013/016339 discloses methods for producing nanostructures from copper-based catalyst material, especially silicon NWs. The reaction can be implemented under mixing or stirring with control of pressure. Very low pressures are disclosed.

Therefore, there was a need for a new efficient method capable of producing high performance silicon-graphite anode materials, for use as anode active material of lithium-ion batteries, with high yields and the possibility to implement the method on industrial scale.

There was a need for a method that can be performed in existing industrial reactors/equipment with minor modifications.

There was a need for a method that allows easy separation of powders and gazes after synthesis.

The present invention describes a novel procedure for making silicon nanowires-carbon/graphite composite for energy storage, namely LIB. This composite could be produced at large/industrial scale and competitive price.

SUMMARY OF THE INVENTION

A first object of the invention consists in a process for the preparation of a carbon-silicon composite material, wherein the process is implemented in a tubular chamber of a reactor, wherein the tubular chamber is capable of rotating around its longitudinal axis (X-X), said process comprising:

(1) introducing into the tubular chamber at least a carbon-based material, comprising a carbon support and optionally a catalyst,
(2) heating the tubular chamber under carrier gas flow,
(3) rotating the tubular chamber,
(4) introducing a reactive silicon-containing gas mixture into the rotating tubular chamber,
(5) applying a thermal treatment at a temperature ranging from 200° C. to 900° C., and a pressure superior or equal to $1.02 \cdot 10^5$ Pa, under reactive silicon-containing gas mixture flow, in the rotating tubular chamber, (6) recovering the obtained product, It being understood that step (3) can start before or after step (1) or step (2).

Another object of the invention is a method of making an electrode including a current collector, said method comprising (i) implementing the method as above disclosed for preparing a carbon-silicon composite material, and (ii) covering at least one surface of the current collector with a composition comprising said carbon-silicon composite material, as an electrode active material.

According to another aspect, the present invention is directed to a method of making an energy storage device, like a lithium secondary battery, including a cathode, an anode, and a separator disposed between the cathode and the anode, wherein said method comprises implementing the method as above disclosed for making at least one of the electrodes, preferably the anode.

According to a favourite embodiment, the pressure at step (5) is from $1.05 \cdot 10^5$ to $10^6$ Pa.

According to a favourite embodiment, the temperature at step (5) ranges from 350° ° C. to 850° C.

According to a favourite embodiment, the carbon-based material is selected from graphite, graphene, carbon, preferably graphite powder with a mean particle size from 0.01 to 50 μm.

According to a favourite embodiment, the carbon-based material bears catalyst particles on its surface.

According to a favourite variant of this embodiment, the catalyst is selected from metals, bimetallic compounds, metallic oxides, metallic nitrides, metallic salts and metallic sulphides.

According to a favourite embodiment, the reactive silicon-containing gas mixture flow comprises at least a reactive silicon species and a carrier gas.

According to a favourite embodiment, the reactive silicon species is selected from silane compounds, preferably the reactive silicon species is silane $SiH_4$.

According to a favourite embodiment, the ratio by volume of the carbon-based material, including the carbon support and optionally the catalyst, based on the volume of the tubular chamber, is from 10% to 60%, more preferably from 20% to 50%, still more preferably from 30% to 50%.

According to a favourite embodiment, at step (5), the reactive silicon-containing gas mixture flow ranges from 0.1 to 50 SLM (Standard Liter per Minute), more preferably from 0.5 to 40 SLM.

According to a variant, at step (5), the reactive silicon-containing gas mixture flow ranges from 0.1 to 10 SLM (Standard Liter per Minute), more preferably from 0.5 to 5 SLM.

According to a favourite embodiment, the rotation speed of the tubular chamber ranges from 1 to 40 RPM (Revolutions Per Minute).

According to a favourite embodiment, the longitudinal axis X-X of the tubular chamber makes an angle with the horizontal axis ranging from 0° to 20°.

According to a favourite embodiment, the process comprises, after stage (6), the application of at least one cycle as follows:

(1') Reloading fresh carbon-based material into the tubular chamber, (2') heating the tubular chamber under carrier gas flow, (3') rotating the tubular chamber, (4') introducing a reactive silicon-containing gas mixture into the rotating tubular chamber, (5') applying a thermal treatment at a temperature ranging from 200° C. to 900° C., and a pressure superior or equal to $1.02 \cdot 10^5$ Pa, under reactive silicon-containing gas mixture flow, in the rotating tubular chamber, (6') recovering the obtained product.

According to a favourite embodiment, the silicon-carbon composite material comprises a carbon-based material and a nanometric silicon material.

According to a favourite embodiment, nanometric silicon material is nanowires or nano-isles, even more preferably nanowires The method according to the invention gives access to an anode active material including carbon-based support and silicon nanomaterials, especially silicon nanowires, grown on the carbon-based support. The material may further comprise a carbon coating layer formed on surfaces of the carbon-based support and the silicon nanomaterials, especially silicon nanowires.

The method according to the invention has many advantages: rotating mechanical fluidized-bed reactors are more flexible than the classical ones. If the heat and mass transfers are lower than in a classical fluidized-bed configuration, rotating reactors allow to use particles with size lower than 30 μm or even 5 μm for chemical vapor deposition reactions with a good efficiency. The solid behavior is independent or less dependent from the gas flow, depending on the column disposition—horizontal or inclined—leading to a higher residence time for reactive species, a lower gas consumption and no or dispensable gas-solid separation device. Indeed, the generation of fines is substantially reduced in this kind of reactor. Pressure tolerance is higher, and the global system is less complex, thus easier to scale up for an industrial production. The inventors have demonstrated that implementing the process at a pressure superior to atmospheric pressure gives very high chemical yields of final composites. This way of proceeding further reduces the necessity to collect particles and fines at the exhaust of the reactor.

The method according to the invention gives access to an anode active material which comprises a carbon-based support and silicon nanomaterials, especially silicon nanowires, deposited on the carbon-based support. The silicon/carbon contact loss during battery charge and discharge may be inhibited by directly growing silicon nanomaterials, especially silicon nanowires, on the carbon-based support. When the material further comprises a carbon coating layer formed on surfaces of the carbon-based support and silicon nanomaterials, especially silicon nanowires, such an additional layer increases the bonding force between the silicon nanomaterials, especially silicon nanowires, and the carbon-based support, and the performance of the battery may thus be further improved.

The method according to the invention has the advantage that it can be performed at laboratory scale (up to 1 kg per day), at pilot scale (up to 100 kg per day) and up to industrial scale (several tons per day), according to the equipment dimensions.

The method according to the invention provides an anode active material, with a homogeneous silicon nanomaterials, especially silicon nanowires, deposition onto the surface of the carbon-based material, preferably graphite, which can be produced on industrial scale and in an economically feasible way. The homogeneous silicon nanomaterials, especially silicon nanowires, deposition improves electrical conductivity of final silicon-carbon composites, preferably silicon-graphite composites and, consequently, secondary battery cyclability.

DETAILED DESCRIPTION

The term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

A first object of the invention consists in a method for the production of a silicon-carbon composite material through a chemical vapor deposition (CVD) based process implemented in a rotating fluidized-bed reactor, said silicon-carbon composite material being suitable for use as anode active material in lithium-ion batteries.

Silicon-carbon composite materials obtained by this method could be used as produced, or after post-production treatments, as silicon-carbon composite anode materials.

The present invention relates to a process for the preparation of a silicon-based nanostructured material. It relates to a process for the preparation of silicon-carbon composite material comprising nano-structured silicon material and a carbon-based material and obtained at high temperature from the chemical decomposition of a reactive silicon-containing gas species in mixture with a carrier gas. This mixture is referred hereinafter as reactive silicon-containing gas mixture. The process is thus based on the chemical vapor deposition (CVD) principle.

The term "nanostructured material" is understood to mean, within the meaning of the invention, a material containing free particles, in the form of aggregates or in the form of agglomerates, at least 5% by weight of said particles of which, with respect to the total weight of the material, have at least one of their external dimensions ranging from 1 nm to 100 nm, preferably at least 10%.

By "composite material", we refer to a material made of at least two constituent materials with significantly different physical or chemical properties.

The external dimensions of the particles may be measured by any known method and notably by analysis of pictures obtained by scanning electron microscopy (SEM) of the composite material according to the invention.

THE CARBON-BASED MATERIAL

Figure 1:
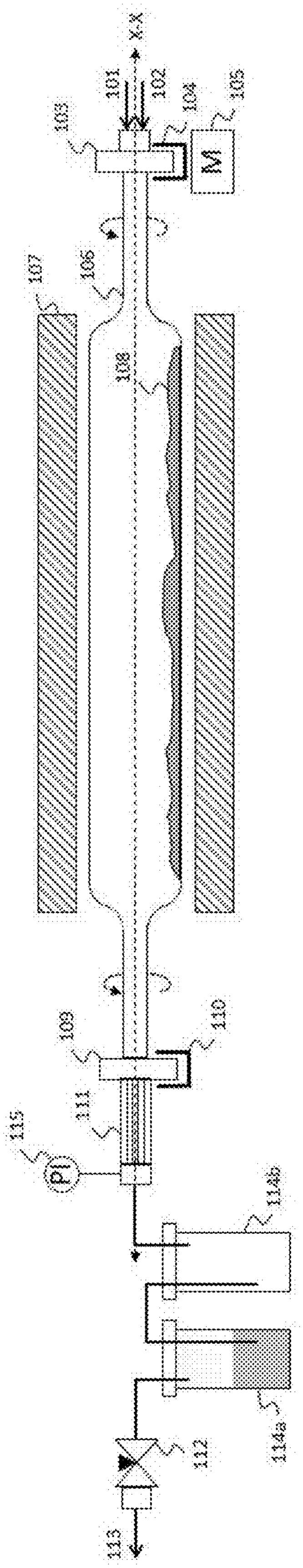
FIG. 1 is a schematic representation of a sectional view of the rotating fluidized-bed reactor.

The process according to the invention comprises the use as a starting material of at least one carbon-based material.

The carbon-based material is advantageously constituted by a micrometric carbon under the form of powder comprising a "carbon support" or "carbon-based support", this carbon support being optionally associated to a catalyst.

According to the invention, the carbon-based material is used as support for the growth of silicon nanomaterials, especially silicon nano-isles or silicon nanowires, preferably silicon nanowires.

The carbon-based support may be any material selected from the group consisting of graphite, graphene, carbon, and more specifically natural graphite, artificial graphite, hard carbon, soft carbon, carbon nanotubes or amorphous carbon, carbon nanofibers, carbon black, expanded graphite, graphene or a mixture of two or more thereof.

The invention has the advantage that ultra-fine graphite powder, a by-product of graphite manufacturing (grinding and rounding processes), can be used as the carbon-based support. Indeed, the rotating chamber reactor is adapted for the use of this material, whereas other types of reactors equipped with filters and/or cyclones are subjected to operating difficulties when particles smaller than 5 μm are introduced in their reaction chamber.

Preferably, the carbon support material is essentially constituted of natural or artificial graphite, and more preferably is solely constituted of natural or artificial graphite.

Preferably, at least 75% by mass of the carbon support is constituted of graphite, more preferably at least 80% by mass, still more preferably at least 90% by mass, even more preferably at least 95% by masse, and advantageously at least 99% by mass, with respect to the total mass of the carbon support.

Preferably, the carbon support is on a micrometric scale. Advantageously, the carbon support presents a mean particle size from 0.01 to 50 μm, preferably from 0.05 to 40 μm, even more preferably from 0.1 to 30 μm, and advantageously from 0.1 to 20 μm. For example, the average particle size of the carbon support may be measured by using a laser diffraction method.

Preferably, the carbon support is under the form of particles, particulate agglomerates, non-agglomerated flakes, or agglomerated flakes.

Advantageously, the carbon support has a Brunauer-Emmett-Teller (BET) surface ranging from 1 to 100 $m^2/g$, more preferably in the range of 3-70 $m^2/g$, even more preferably in the range of 5-50 $m^2/g$.

According to a favourite variant, the carbon-based material bears catalyst particles on its surface. Even more advantageously, when a catalyst is present, the carbon-based material's surface is uniformly decorated by nanometric catalyst particles or their precursors.

The Catalyst

The method according to the invention may be implemented with or without a catalyst.

According to a favourite variant the process according to the invention comprises the introduction into the rotating chamber of the reactor of at least one catalyst.

The function of the catalyst is to create growth sites on the surface of the carbon support.

Preferably, according to this variant, the catalyst is chosen from metals, bimetallic compounds, metallic oxides, metallic nitrides, metallic salts, metallic sulphides and organometallic compounds.

Among metal catalysts, one can mention gold (Au), cobalt (Co), nickel (Ni), bismuth (Bi), tin (Sn), iron (Fe), indium (In), aluminium (Al), manganese (Mn), iridium (Ir), silver (Ag), copper (Cu), calcium (Ca) and mixtures thereof.

Among bimetallic compounds, mention may be made of manganese and platinum $MnPt_3$, or iron and platinum FePt.

Among metallic sulphides, mention may be made of tin sulphide SnS.

Among metallic oxides, mention may be made of ferric oxide $Fe_2O_3$ and tin oxide $SnO_{2-x}$ ($0 \leq x < 2$).

More preferably, according to this variant, the catalyst is chosen from metals and metallic oxides.

Preferably, when present, the catalyst is selected from gold (Au), tin (Sn) and tin dioxide ($SnO_2$).

Advantageously, when present, the catalyst is tin dioxide, $SnO_2$.

Preferably, according to this variant, the catalyst is under the form of particles, more preferably under the form of nanoparticles.

Preferably, according to this variant, the longest dimension of the catalyst nanoparticles ranges from 1 nm to 100 nm, more preferably from 1 nm to 50 nm, and still more preferably from 5 nm to 30 nm.

Advantageously, when present, the catalyst nanoparticles are spherical.

According to a favourite embodiment, the catalyst is under the form of nanometric spherical particles with a diameter ranging from 1 to 30 nm, preferably from 5 nm to 30 nm.

Gold nanoparticles that may be used in the process according to the invention are for example prepared and disclosed in M. Brust et al., *J. Chemical Society, Chemical Communications,* 7(7): 801-802, 1994.

The metal which will form the catalyst is preferably introduced in the form of a thin metallic layer which, at the beginning of the process, liquefies under the effect of heat and then separates from its support by forming drops of liquid metal. The metal may also be introduced in the form of a metallic salt layer coated on the growth substrate which, at the beginning of the growth process, is reduced under the effect of a reducing gas such as for example dihydrogen $H_2$.

The metal may be introduced in the form of an organometallic compound which decomposes during the growth of the particles and which deposits metal in the form of nanoparticles or drops on the carbon support.

Preferably, according to this variant, the catalyst nanoparticles are dispersed on the surface of the carbon support.

Catalyst and carbon support may be or may not be in contact.

According to a preferred embodiment, the carbon support and the catalyst are associated before their introduction into the reactor.

For the purposes of the invention, the term “associated” means that the carbon support and the catalyst have previously undergone an association step corresponding to the attachment or deposition of at least a portion of the catalyst on at least part of the surface of the carbon support. In other words, at least a part of the catalyst is linked to the surface of the carbon support, for example by physical bonding or by adsorption.

Preferably, according to this variant, the catalyst and the carbon support are used according to a mass ratio catalyst/carbon support ranging from 0.01 to 1, more preferably from 0.02 to 0.5, and still more preferably from 0.05 to 0.1.

The association of the catalyst with the carbon support allows the formation of a plurality of particles growth sites on the surface of the carbon support.

According to another variant, the method according to the invention is implemented without a catalyst.

The Precursor Composition of the Silicon Nanomaterial, Especially Nanowires

The process according to the invention comprises the introduction into the rotating fluidized-bed reactor of a precursor composition of nanometric silicon material, designated «reactive silicon-containing gas species», preferably a precursor composition of silicon nano-isles or nanowires, even more preferably a precursor composition of silicon nanowires.

The precursor composition of silicon particles comprises at least one precursor compound of silicon nanomaterial, especially silicon nanowires.

By “precursor compound of nanometric silicon material” or “precursor compound of silicon nanomaterial”, we refer to a compound capable of forming nanometric silicon material on the surface of the carbon support material by implementing the method according to the invention.

By “precursor compound of silicon nano-isles or nanowires”, we refer to a compound capable of forming silicon nano-isles or nanowires on the surface of the carbon support material by implementing the method according to the invention.

Preferably, the precursor compound is in the form of a reactive silicon-containing gas species in mixture with a carrier gas (forming a reactive silicon-containing gas mixture).

Preferably, the precursor compound of nanometric silicon material, in particular silicon nanowires, or «reactive silicon-containing gas species», is a silane compound or a mixture of silane compounds.

For the purpose of the invention, the term “silane compound” refers to compounds of formula (I):

$$R_1—(SiR_2R_3)_n—R_4 \quad (I)$$

wherein:

n is an integer ranging from 1 to 10, and $R_1$, $R_2$, $R_3$ and $R_4$ are independently chosen from hydrogen, $C_1$-$C_{15}$ alkyl groups, $C_6$-$C_{12}$ aryl groups, $C_7$-$C_{20}$ aralkyl groups and chloride.

According to this embodiment, preferably, the silicon-containing gas species is chosen from compounds of formula (I) wherein:

n is an integer ranging from 1 to 5, and $R_1$, $R_2$, $R_3$ and $R_4$ are independently chosen from hydrogen, $C_1$-$C_3$ alkyl groups, phenyl, and chloride.

Even more preferably, n is an integer ranging from 1 to 3, and $R_1$, $R_2$, $R_3$ and $R_4$ are independently chosen from hydrogen, methyl, phenyl, and chloride.

According to this embodiment, preferably, the reactive silicon-containing gas species is chosen from silane, disilane, trisilane, chlorosilane, dichlorosilane, trichlorosilane, dichlorodimethylsilane, phenylsilane, diphenylsilane or triphenylsilane or a mixture thereof.

According to a preferred embodiment, the reactive silicon-containing gas species is silane ($SiH_4$).

According to a most preferred embodiment, the reactive silicon-containing gas species is essentially composed, or better still it is exclusively composed, of one or more precursor compounds of nanometric silicon material, in particular of the silicon nanowires.

According to a preferred embodiment, the reactive silicon-containing gas species is introduced into the reactor in mixture with a carrier gas.

The Reactive Silicon-Containing Gas Mixture

The silicon material is obtained from the chemical decomposition at high temperature of a reactive silicon-containing gas species, which may be in mixture with a carrier gas. This mixture is referred to hereinafter as «reactive silicon-containing gas mixture».

By "carrier gas", we refer to a gas that is chosen from a reducing gas, an inert gas, or a mixture thereof.

Preferably, the reducing gas is hydrogen ($H_2$).

Preferably, the inert gas is chosen from argon (Ar), nitrogen ($N_2$), helium (He), or a mixture thereof.

Preferably, the carrier gas composition, constituted of a reducing gas and an inert gas, comprises from 0 to 99% by volume of reducing gas, more preferably from 20 to 99% by volume of reducing gas.

According to a preferred embodiment, the silicon-containing gas mixture is composed of at least 0.5% by volume of silicon-containing gas species, preferably at least 10% by volume, more preferably at least 50% by volume, still more preferably 100% by volume.

The carrier gas used at step (2) of the process may be the same or different from the carrier gas which is used in mixture with the silicon-containing gas species at step (5).

The proportion of silicon-containing gas species and carrier gas can be modulated at different levels at different steps of the process.

The Rotating Fluidized-Bed Reactor

The rotating fluidized-bed reactor here-above mentioned and hereinafter described is composed of at least a tubular chamber, heated by a furnace, in which the carbon-based material is loaded. The reactor integrates a rotating mechanism. The reactor can comprise two tubular chambers. The tubular chamber can be tilted. The reactor further comprises a product feeding system and a product discharge system, allowing a semi-continuous production of silicon-carbon composite material. The rotating fluidized-bed reactor comprises a reactor pressure control device, like for example a needle valve, or a pressure controller.

To the difference of classical fluidized-bed reactors, mechanical type fluidized-bed reactors take advantage of an external action other than the gas flow, this action consisting in the reactor rotation along its longitudinal axis, to fluidize the powder bed. A typical mechanical fluidized-bed reactor is the rotating Lödige's type fluidized-bed reactor, where fluidization is generated by the rotation of the tubular chamber.

An advantage of the method according to the invention consists in the scale-up possibility to produce on an industrial scale the carbon-silicon composite materials through a chemical vapor deposition (CVD) based rotating Lödige's type fluidized-bed reactor.

Fluidized-Bed Reactor-Batch Mode

FIG. 1 illustrates the rotating fluidized-bed reactor device. The reactor is composed of a tubular quartz chamber 106 extending along a central, longitudinal axis X-X. The chamber 106 is surrounded and heated by a furnace 107. The furnace is heated resistively, inductively or with infrared lamps. Once the carbon powder material 108 is loaded, the chamber 106 is closed by two flanges 103 and 109 at the extremities of the chamber 106. Each flange lies on a bearing system 104 and 110. The bearing system 104 is connected to a motor 105. The motor 105 allows the chamber 106 to rotate around the longitudinal axis X-X through bearing system 104. The rotating fluidized-bed reactor includes a carrier gas input 101 at one extremity of the chamber 106, also designated as entry of the chamber 106, a reactive silicon-containing gas mixture input 102 at the same extremity of the chamber 106 as the carrier gas input 101. At the opposite extremity of the chamber 106, also designated as exit of the chamber 106, there is a tubular gas cooling device 111, and a needle valve 112 for perfect reactor pressure control. Between the needle valve 112 and the gas tubular cooling device 111 is placed a double-vessel liquid trap 114*a*, 114*b*, for valve protection and fines/silane by-products collecting, one of the vessels 114 a being filled with oil. A general gas output 113 is located at the exit of the needle valve 112, Pressure indicator 115, located at the exit of the chamber 106, measures the reactor pressure. The reactor control device monitoring the process parameters like temperature, carrier gas flow, reactive silicon-containing gas mixture flow, and rotation speed is not illustrated in FIG. 1.

Continuous Mode Reactor

Figure 7:
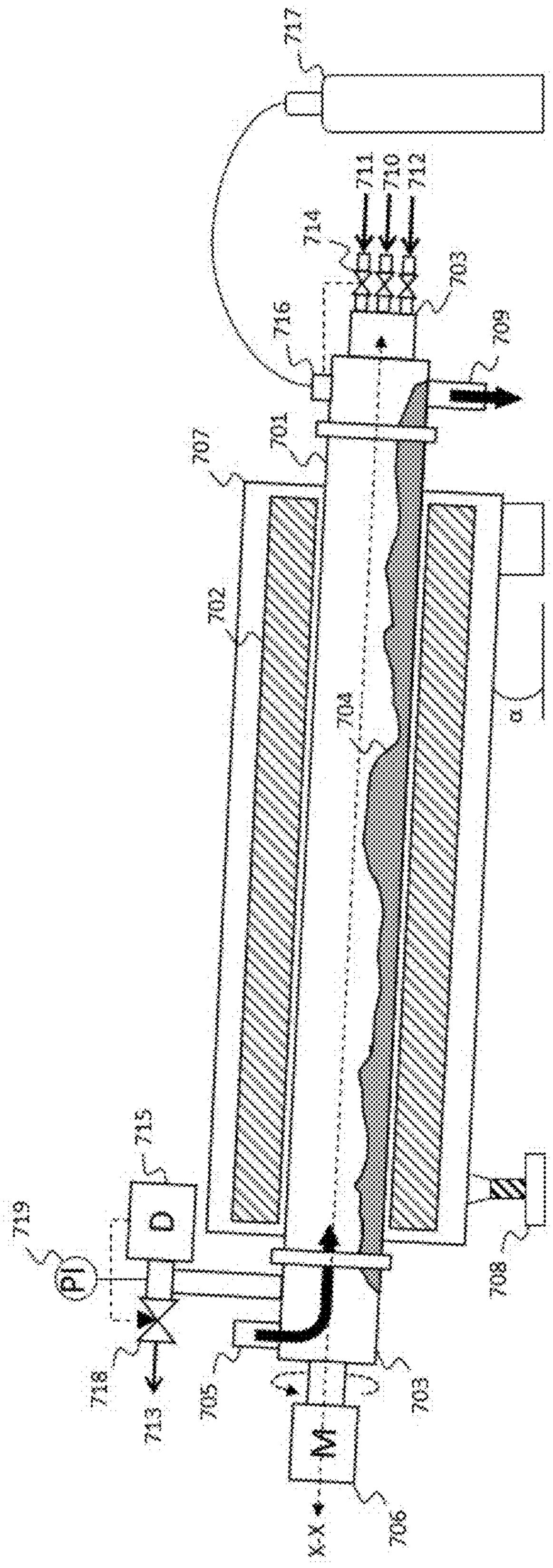
FIG. 7 is a schematic representation of a sectional view of the Lödige's type rotating fluidized-bed reactor.

FIG. 7 illustrates an industrial rotating Lödige's type fluidized-bed reactor. The reactor is composed of a tubular chamber 701 extending along a central, longitudinal axis X-X. The chamber 701 is surrounded and heated by a single-zone or a multi-zone furnace 702. The furnace is heated resistively, inductively or with infrared lamps. The tubular chamber 701 is closed by at least two boundary systems 703 at the extremities of the chamber 701. The carbon material 704 is loaded by the product feeding system 705 at a first extremity of the chamber 701. The motor 706 allows the chamber 701 to rotate when boundary systems 703 remain motionless. The furnace 702 remains set to the device support 707. The rotating Lödige's type fluidized-bed reactor can be tilted by a tilting system 708. Preferably, the tilting angle $\alpha$ of the reactor's longitudinal axis X-X with the horizontal plane is inferior or equal to 20°. The tilting system 708 allows the carbon-based material to slide from the product feeding system 705 to the product discharge system 709, located at the opposite extremity of the chamber 701, with a speed depending on the rotation speed and the tilt angle. The rotating Lödige's type fluidized-bed reactor includes a carrier gas input 710, at least one reactive silicon-containing gas mixture input 711, an inert gas input 712, all three located at the extremity of the chamber 701 opposite to the product feeding system 705, and a general gas output 713, located at the same extremity as the product feeding system 705. Those gas inputs and output may be pre-heated by a corresponding system and may integrate valves 714, 718. The valve 718 of the general gas output 713 allows reactor pressure control and may be managed by at least one reactive silicon-containing gas detector 715, depending on the number of reactive silicon-containing gas sources used. Pressure indicator 719 gives the reactor pressure. A gas security tank 717 is connected to the tubular chamber 701 through a rupture-disk security system 716 placed on a boundary system 703 and which may integrate a pressure sensor (not represented). Through the pressure sensor of the rupture-disk security system 716, the valve 714 of the reactive silicon-containing gas mixture input 711 may be controlled both for security and process efficiency and flexibility. Indeed, increasing the silicon-containing gas species pressure inside the tubular chamber 701 allows a control on the silicon material growth, hence, structure. The product collecting tank and reactor control device monitoring the process parameters like temperature, carrier gas and reactive silicon-containing gas mixture flows, tilt angle and rotation speed are not illustrated in FIG. 7.

The product feeding system 705 may be a feeding endless screw system, a dosing system, or a funnel-type system. The same is available for the product discharge system 709. The latter may include a cooling system.

The rotating tubular chamber 701 and/or the process support 707 and/or the boundary systems 703 may integrate other devices depending on the complexity of the production operation. Those devices include thermocouples, pressure sensors, optics, sealing systems, sampling systems, analytical apparatus for gas or product control.

The rotating tubular chamber 701 may include internals such as fixed fins, moving rods or moving balls. The geometry, layout and number of fins, size and number of rods and balls depend on the physical properties of the carbon-based material powder 704.

One advantage of the process according to the invention is that mechanical fluidized-bed reactors are easier to scale-up for industrial production than classical fluidized-bed reactors. Powders with a particle size lower than 30 μm (C-group from the Geldart's powder classification) can easily be treated using this type of fluidized-bed reactor whereas in classical fluidized-bed reactors it remains difficult. Moreover, reactive species residence times are much higher in a rotating fluidized-bed reactor, allowing a better production efficiency from a chemical, thus economical, point-of-view, because the solid particles behavior is independent or less-dependent from the gas flow. The solid particles movement provided by reactor motion.

Double Chamber Reactor

Figure 9:
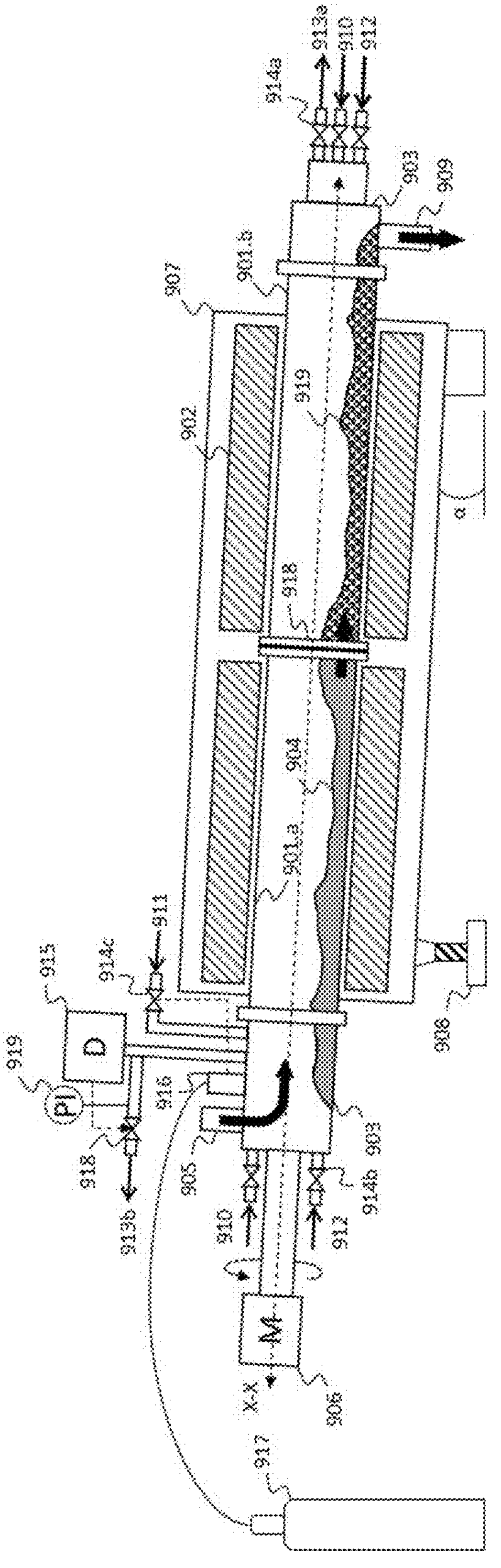
FIG. 9 is a schematic representation of a sectional view of a variation of the industrial rotating Lödige's type fluidized-bed reactor.

FIG. 9 illustrates a variation of the hereinabove described industrial rotating Lödige's type fluidized-bed reactor. In this case the reactor is composed of two tubular chambers 901.*a* and 901.*b*, extending along a central, longitudinal axis X-X, each heated by a single-zone or a multi-zones furnace 902. The tubular chambers 901.*a* and 901.*b* are closed by at least two fixed boundary systems 903 and separated by a separation system 918. The tubular chamber 901.*a* is dedicated to the silicon-carbon composite material production. It is loaded with carbon material by the product feeding system 905. The tubular chamber 901.*b*, called hereinafter the granulation chamber, is dedicated to the granulation of the silicon-carbon composite material. The granulation is the process of forming granules or grains from a powdery substance, thus producing a granular material. The granulation chamber is loaded with fresh silicon-carbon composite material 904 by the separation system 918 to obtain silicon-carbon composite granules 919. The motor 906 allows the chambers to rotate. The furnaces 902 remains fixed to the process support 907. The rotating Lödige's type fluidized-bed reactor can be tilted by a tilting system 908. The tilting system 908 allows the carbon-based material to spread into the tubular chamber 901.*a*, the silicon-carbon composite material 904 to slide from the chamber 901.*a* to the chamber 901.*b* through the separation system 918, and the silicon-carbon composite granules 919 to slide toward the product discharge system 909 with a speed depending on the rotation speed and the tilt angle. The rotating Lödige's type fluidized-bed reactor includes carrier gas inputs 910, at least one reactive silicon-containing gas mixture input 911 connected to the production chamber 901.*a*, inert gas inputs 912 and general gas outputs 913*a*, 913*b*. Those gas inputs and outputs may be pre-heated by a corresponding system and may integrate valves 914*a*, 914*b*, 914 *c*. The valve 918 of the general gas output 913*b* of the chamber 901.*a* allows a perfect reactor pressure control and may be managed by at least one reactive silicon-containing gas detector 915, depending on the number of reactive silicon-containing gas sources used. Pressure indicator 919 measures the reactor pressure. A gas security tank 917 is connected to the tubular chamber 901.*a* through a rupture-disk security system 916 placed on a boundary system 903 and which may integrate a pressure sensor. Through the pressure sensor of the rupture-disk security system 916, the valve 914*c* of the reactive silicon-containing gas mixture input 911 may be controlled both for security and process efficiency and flexibility. Indeed, increasing the silicon-containing gas species pressure inside the tubular chamber 901.*a* allows a control on the silicon material growth, hence, structure. The product collecting tank and reactor control device monitoring the process parameters like temperature, carrier gas and reactive silicon-containing gas mixture flows, tilt angle and rotation speed are not illustrated in FIG. 9.

The product feeding system 905 may be a feeding endless screw system, a dosing system, or a funnel-type system. The same is available for the product discharge system 909. The latter may include a cooling system.

The separation system 918 acts as a link between the tubular chambers 901.*a* and 901.*b* and rotate the same when the motor 906 is used. It integrates a three-layers gears system allowing it to remain closed when the production and granulation steps occurred in tubular chambers 901.*a* and 901.*b* respectively and opened when the said steps are completed so that the silicon-carbon composite material can slide from one chamber to another. Hence it is possible to perform the granulation of a silicon-carbon composite material batch in the tubular chamber 901.*b* while producing another silicon-carbon composite material batch in the tubular chamber 901.*a*.

The rotating tubular chambers 901 and/or the process support 907 and/or the boundary systems 903 may integrate devices depending on the complexity of the production operation. Those devices include thermocouples, pressure sensors, optics, sealing systems, sampling systems, analytical apparatus for gas or product control.

The tubular chamber 901.*a* may include internals such as moving rods or moving balls. The size and number of rods and balls depend on the physical properties of the initial carbon-based material powder. The tubular chamber 901.*b* may include internals such as fixed fins. The geometry, layout and number of fins depend on the physical properties of the silicon-carbon composite material 904.

The Method for the Production of the Carbon-Silicon Composite Material

The process according to the invention comprises:

(1) introducing into the tubular chamber at least the carbon-based material and optionally a catalyst,
(2) heating the tubular chamber under carrier gas flow,
(3) rotating the tubular chamber,
(4) introducing a reactive silicon-containing gas mixture into the rotating tubular chamber,
(5) applying a thermal treatment at a temperature ranging from 200° ° C. to 900° C., and a pressure superior or equal to $1.02 \cdot 10^5$ Pa, under reactive silicon-containing gas mixture flow, in the rotating tubular chamber,
(6) recovering the obtained product, Most steps have to be accomplished according to this order, however, the rotation at step (3) can start before or after step (1) or step (2).

Step (1)

Preferably, the loading ratio by volume of carbon-based material (including the carbon support and optionally the catalyst), based on the volume of the tubular chamber, is from 10% to 60%, more preferably from 20% to 50%, still more preferably from 30% to 50%.

Step (2) to (5)

Preferably the temperature ramp at step (2) ranges from 1° ° C. to 50° C./min, more preferably from 5° C. to 30° C./min, still more preferably is around 10° C./min, until the chamber reaches the desired value.

At step (5), the tubular chamber is maintained at a temperature ranging preferably from 200° C. to 900° C., more preferably from 350° C. to 850° C., still more preferably from 450° C. to 750° C.

The furnace can be heated resistively, inductively or with infrared lamps.

At step (5), the pressure in the tubular chamber is controlled and preferably ranges from $1.02 \cdot 10^5$ Pa to $5 \cdot 10^6$ Pa, more preferably the pressure ranges from $1.05 \cdot 10^5$ Pa to $10^6$ Pa, even more preferably from $1.1 \cdot 10^5$ Pa to $10^6$ Pa.

The duration of the treatment of step (5), combining the treatment by the reactive silicon-containing gas mixture and heating in the rotating chamber, is preferably from 1 minute to 10 hours, advantageously from 5 minutes to 5 hours, even more preferably from 15 minutes to 10 hours.

Preferably, at step (2), the carrier gas flow ranges from 0.1 SLM to 50 SLM (Standard Liter per Minute), more preferably from 0.5 SLM to 40 SLM.

According to a variant, at step (2), the reactive silicon-containing gas mixture flow ranges from 0.1 SLM to 10 SLM (Standard Liter per Minute), more preferably from 0.5 SLM to 5 SLM.

Preferably, at step (5), the reactive silicon-containing gas mixture flow ranges from 0.1 SLM to 50 SLM (Standard Liter per Minute), more preferably from 0.5 SLM to 40 SLM.

According to a variant, at step (5), the reactive silicon-containing gas mixture flow ranges from 0.1 SLM to 10 SLM (Standard Liter per Minute), more preferably from 0.5 SLM to 5 SLM.

Carrier gas flow and reactive silicon-containing gas mixture flow can be the same or different.

The carrier gas used at step (2) of the process may be the same or different from the carrier gas which is used in mixture with the silicon-containing gas species at step (5).

The gas flow at step (2) results in a decrease in the oxygen content in the reactor chamber.

The gas flow at step (5) results in the growth of nano structured silicon on the carbon-based support in the reactor chamber.

Preferably, at the end of step (5), the reactive silicon-containing gas mixture flow is stopped, and the tubular chamber is left to cool to room temperature under carrier gas flow.

Preferably, the rotation speed of the tubular chamber ranges from 1 RPM to 40 RPM (Revolutions Per Minute), preferably from 1 RPM to 30 RPM, even more preferably from 1 RPM to 20 RPM, more preferably from 1 RPM to 15 RPM.

According to a variant, the rotation speed of the tubular chamber ranges from 1 RPM to 40 RPM (Revolutions Per Minute), preferably from 10 RPM to 30 RPM, even more preferably from 15 RPM to 25 RPM.

According to a first embodiment, the longitudinal axis X-X of the tubular chamber is horizontal.

According to a second embodiment, the longitudinal axis X-X of the tubular chamber is inclined and makes an angle $\alpha$ with the horizontal plane. Advantageously, according to this embodiment, the tilt angle ranges from 1 to 20 degrees, more preferably from 5 to 15 degrees, advantageously around 10 degrees.

According to an advantageous embodiment, the process according to the invention comprises, after stage (6), the application of at least one following cycle:

(1') Reloading fresh carbon-based material (including the carbon support and optionally the catalyst) into the tubular chamber, (2') heating the tubular chamber under carrier gas flow, (3') rotating the tubular chamber, (4') introducing a reactive silicon-containing gas mixture into the rotating tubular chamber, (5') applying a thermal treatment at a temperature ranging from 200° C. to 900° C., and a pressure superior or equal to $1.02 \cdot 10^5$ Pa, under reactive silicon-containing gas mixture flow, in the rotating tubular chamber, (6') recovering the obtained product.

Favourite embodiments of steps (1') to (6') are identical to the favourite embodiments of, respectively, steps (1) to (6).

Advantageously, between two cycles, heating of the tubular chamber is continued, the tubular chamber rotation may be reduced or completely stopped, the gas flow may continue as a carrier gas flow.

The rotation at step (3') can start before or after step (1') or step (2'). Alternately, rotation may be continuous from one cycle to another, and the speed of rotation can vary between cycles.

Additional Steps

According to some embodiments, additional steps may optionally be achieved between step (5) and step (6), for example a carbon coating layer may be formed on the surface of the silicon-carbon composite material. In this case, one or several additional gas input integrated valves could be added for carbonaceous gas species.

For example, the process may comprise an additional step of heat treatment of the silicon-carbon composite material obtained at the end of step (5) in the presence of a carbon source.

For example, the process may comprise an additional step of injecting inert gas into the tubular chamber to avoid oxygen contamination before step (6).

According to one embodiment, the process according to the invention additionally comprises a step (G) of granulating the product obtained on conclusion of step (5) or step (5'). According to this embodiment, the product obtained in stage (5) or (5') is introduced into a granulation chamber and the granulation chamber is rotated for a determined amount of time. After the granulation is considered complete, the product is recovered (6) and can be submitted to further post-treatment steps, like for example a thermal treatment.

Method-Batch Mode

Figure 2:
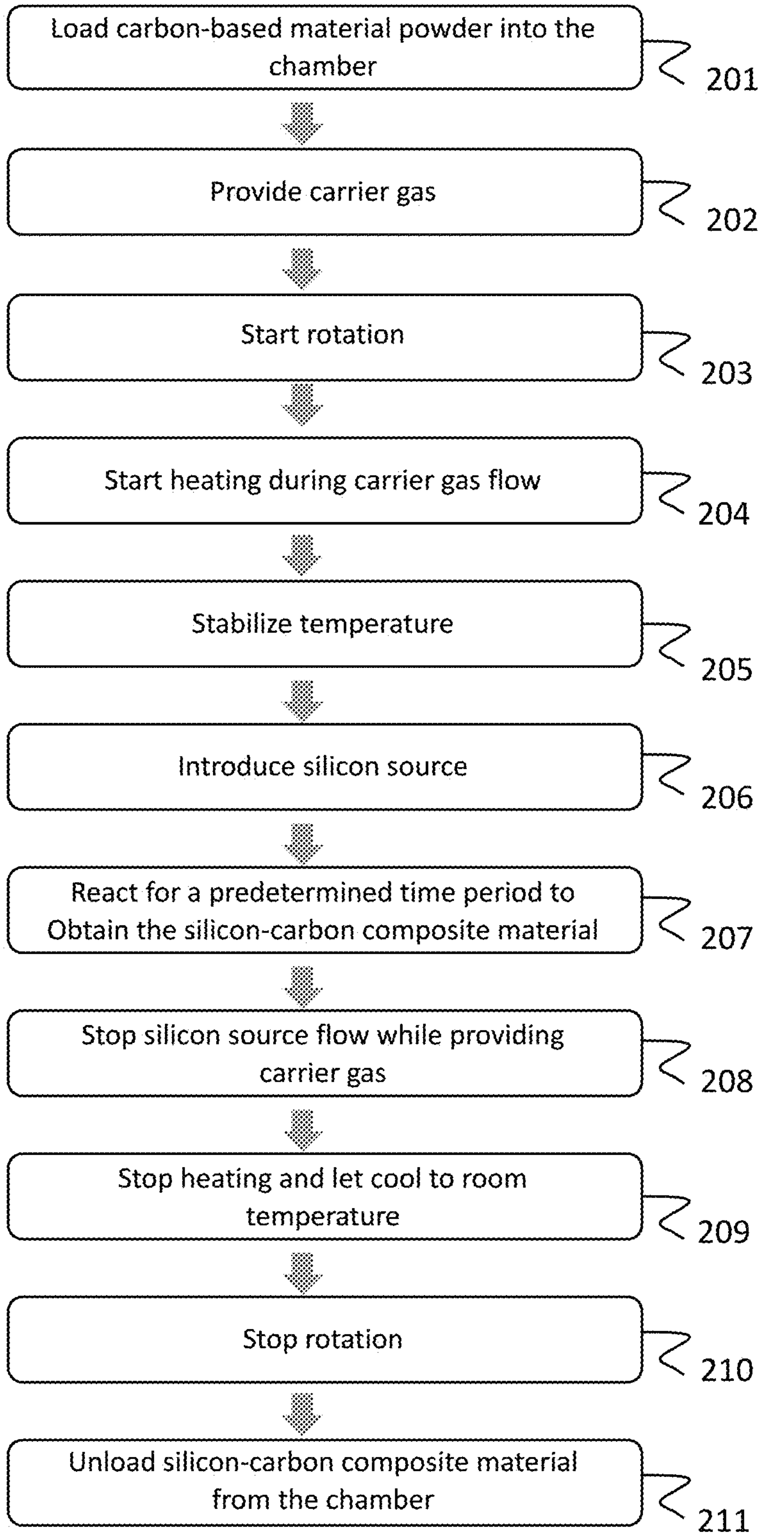
FIG. 2 is a diagrammatic representation of the method to produce silicon-carbon composite material in the rotating fluidized-bed reactor.

FIG. 2 illustrates the method for producing the silicon-carbon composite material in a rotating Lödige's type fluidized-bed reactor such as the reactor of FIG. 1. Carbon-based powder material 108, including optionally the catalyst, is loaded into the tubular quart chamber 106 at step 201 by removing the flange 109. When the carbon-based powder material 108 is loaded, the chamber 106 is closed by the flange 109 and the latter is installed into the bearing system 110. The tubular cooling device 111, the needle valve 112 and the general gas output 113 are then connected to the flange 109 according to the disposition displayed on FIG. 1. Carrier gas is provided to chamber 106 at step 202 through the carrier gas input 101. The rotation and the heating of the chamber 106 start respectively at step 203 and 204. When the desired reactor temperature is reached, it is stabilized during a certain amount of time in step 205. At step 206, the carrier gas input 101 is closed and the reactive silicon-containing gas mixture input 102 is opened instead. During heating under inert gas flow, pressure is monitored using the needle valve 112. The reactive silicon-containing gas mixture flow may have the same value as the carrier gas flow in step 202. During step 207, the silicon source from the reactive silicon-containing gas mixture reacts with the carbon-based powder material for a pre-determined amount of time, to form the silicon-carbon composite material. The duration of the treatment depends on the silicon source and its concentration in the gas flow. Once the production of the silicon-carbon composite material is complete, the reactive silicon-containing gas mixture input 102 is closed and the carrier gas input 101 is opened instead at step 208. The carrier gas flow may have the same value as in step 202. At the same time, the furnace 107 is switched off and the chamber 106 cools to the room temperature (step 209) under carrier gas flow. When the room temperature is reached, the rotation is stopped (step 210) and the silicon-carbon composite material is unloaded in step 211 by disconnecting the tubular cooling device 111 from the flange 109 and removing the latter from the bearing system 110 and the chamber 106.

Method-Continuous Mode

Figure 8:
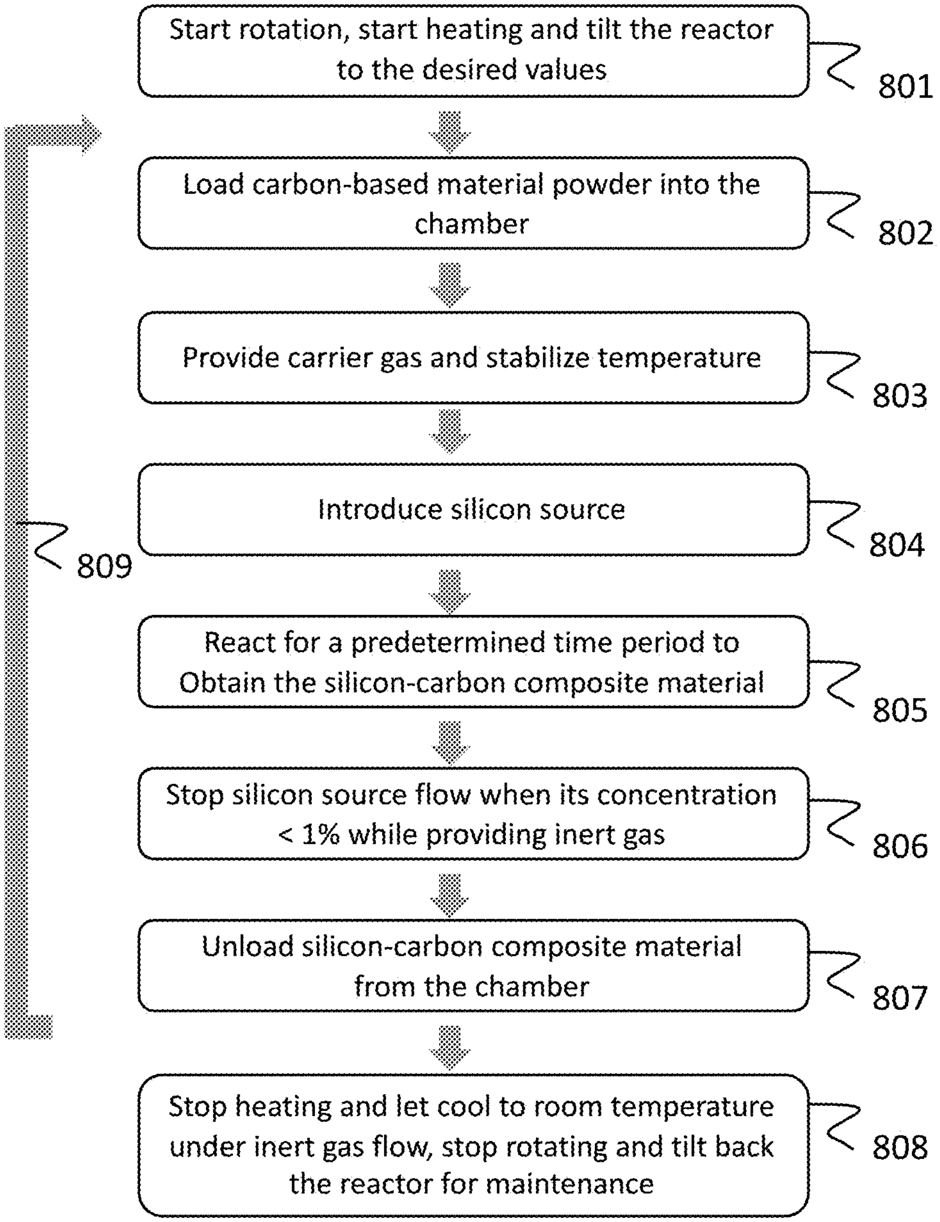
FIG. 8 is a diagrammatic representation of the method to produce silicon-carbon composite material in a rotating Lödige's type fluidized-bed reactor.

FIG. 8 illustrates the method to produce silicon-carbon composite material in a rotating Lödige's type fluidized-bed reactor such as the reactor of FIG. 7. The production method starts in step 801 wherein the process support 707 is tilted via the tilting system 708. Then, rotation of the rotating tubular chamber 701 is started with the desired rotating speed and the chamber is heated to the desired temperature. Then, the carbon-based powder material 704, optionally including the catalyst, is loaded into the tubular quartz chamber 701 at step 802 by opening the product feeding system 705. At step 803, the product feeding system 705 is closed while providing the carrier gas into the rotating tubular chamber 701 by the carrier gas input 710. The temperature stabilizes during a certain amount of time. When the desired reactor temperature is reached, the carrier gas input 710 is automatically closed and the reactive silicon-containing gas mixture input 711 is opened instead at step 804. The reactive silicon-containing gas mixture flow may have the same value as the carrier gas flow in step 801. During step 805, the silicon source from the reactive silicon-containing gas mixture reacts with the carbon-based powder material for a pre-determined amount of time, depending on the silicon source and its concentration in the gas flow, to form the silicon-carbon composite material. It is possible to keep the general gas output 713 closed to increase the reactive silicon-containing gas pressure inside the tubular chamber 716. Once the production of the silicon-carbon composite material is considered complete, the reactive silicon-containing gas mixture input 711 is closed and the inert gas input 712 is opened instead as well as the general gas output 713 to purge the rotating tubular chamber 701 and the silicon-carbon composite material from any remaining reactive gas species.

The inert and carrier gas flow and the reactive silicon-containing gas mixture flow may have the same value in step 803 and/or step 804 and/or step 806. The silicon-carbon composite material is unloaded at step 807 by opening the product discharge system 709.

At this point, it is possible to adopt a semi-continuous production mode 809 by repeating all the here-above-described steps starting by the step 802: loading again a carbon-based material powder 704 into the rotating tubular chamber 701 by opening the product feeding system 705. The temperature of the chamber 701 is maintained but its rotation may be slowed or stopped between two cycles.

The step 808 allows the production process to be stopped for system maintenance or security reasons. Under inert atmosphere, the furnace 702 is switched off and the tubular chamber 701 cools to the room temperature while rotation is stopped, and the reactor is tilted back to horizontal if needed.

Method-Granulation Mode

Figure 10:
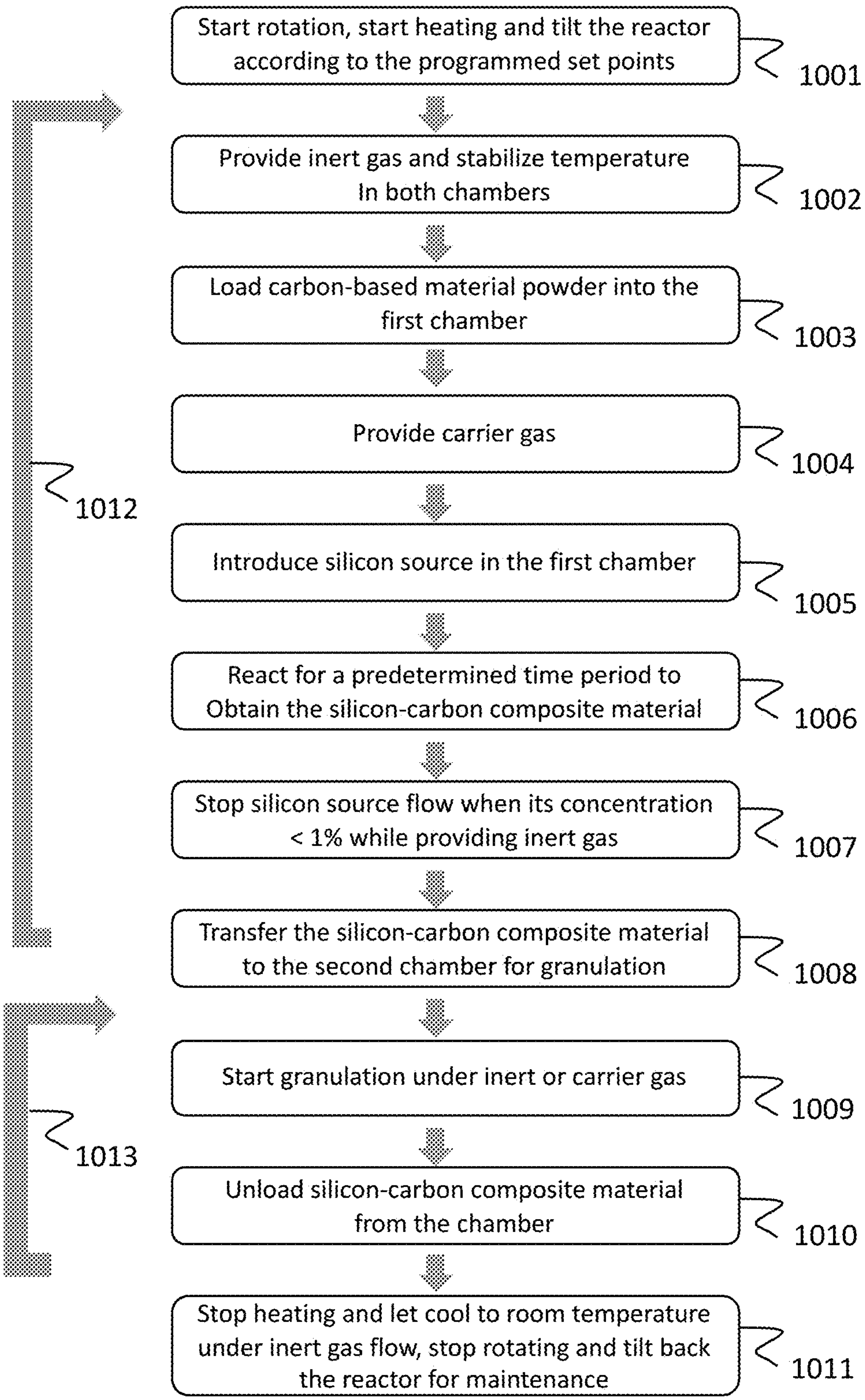
FIG. 10 is a diagrammatic representation of the method to produce silicon-carbon composite material in the variation of the rotating Lödige's type fluidized-bed reactor illustrated in FIG. 9.

FIG. 10 illustrates the method to produce silicon-carbon composite material in the rotating Lödige's type fluidized-bed reactor variation related to FIG. 9. The production method starts in step 1001 tilting the process support 907 via the tilting system 908, starting rotation of the rotating tubular chambers 901.*a* and 901.*b* with the desired rotating speed and heating each of them to the desired temperatures. In step 1002, inert gas is provided in both chambers by the inert gas input 912 and temperature stabilizes during a certain amount of time. Then, the carbon-based powder material is loaded into the first tubular chamber 901.*a* at step 1003 by opening the product feeding system 905. At step 1004, the product feeding system 905 is closed while providing the carrier gas into the rotating tubular chamber 901.*a* by the carrier gas input 910. When the desired temperature is reached, the carrier gas input 910 is closed and the reactive silicon-containing gas mixture input 911 is opened instead at step 1005. During step 1006, the silicon source from the reactive silicon-containing gas mixture reacts with the carbon-based powder material to form the silicon-carbon composite material for a pre-determined amount of time, depending on the silicon source and its concentration in the gas. The general gas output 913 is closed to increase the reactive silicon-containing gas pressure inside the tubular chamber 901.*a*. Once the production of the silicon-carbon composite material 904 is considered complete at step 1007, the reactive silicon-containing gas mixture input 911 is closed and the inert gas input 912 is opened instead as well as the general gas output 913 to purge the rotating tubular chamber 901.*a* and the silicon-carbon composite material from any remaining reactive gas species.

When the tubular chamber 901.*a* is purged by inert gas, the separation system 918 opens and the silicon-carbon composite material 904 is transferred to the granulation chamber 901.*b* in step 1008. At this point, it is possible to adopt a semi-continuous production 1012 by repeating the method from the step 1002 to the step 1008.

The granulation of the silicon-carbon composite material 904 starts in step 1009 by providing inert or carrier gas, depending on the needs, by the inert gas and carrier gas inputs 910 and 912, and run for a pre-determined amount of time. The obtained silicon-carbon composite granules 919 are then unloaded from the granulation chamber 901.*b* by the product discharge system 909. At this point, it is possible to adopt a semi-continuous granulation 1013 by repeating the method from the step 1009 to the step 1010.

The step 1011 allows the production process to be stopped for system maintenance or security reasons. Under inert atmosphere, the furnaces 902 are switched off and the tubular chambers 901 cool to the room temperature while rotation is stopped, and the reactor is tilted back to horizontal if needed.

The Silicon-Carbon Composite Material

The invention gives access to a silicon-carbon composite material that may be obtained by carrying out the process here-above described.

The silicon-carbon composite material obtainable by this method comprises a carbon-based material and a nanometric silicon material. The carbon-based material comprises the above-described carbon support and optionally the catalyst.

Catalyst and carbon support may be or may not be in contact. Preferably, when present, the catalyst is in contact with the surface of the carbon support. The contact between the catalyst and the carbon support may be by chemisorption or physisorption.

More preferably, when present, the catalyst, under the form of particles, is well dispersed onto the surface of the carbon support.

Preferably, the nanostructured silicon material is composed of silicon particles having at least one of their external dimensions ranging from 10 nm to 500 μm, preferably ranging from 10 nm to 500 nm.

The silicon material, resulting from chemical vapor decomposition of the silicon-containing gas species, is under the form of wires, worms, rods, filaments, isles, particles, films, sheets or spheres.

The presence or absence of a catalyst has an influence on the type of silicon particles obtained.

According to a preferred embodiment, the silicon particles are in the form of nanowires. Si nanowires are preferably obtained by a method comprising the use of a catalyst.

The term "nanowire" is understood to mean, within the meaning of the invention, an elongated element, the shape of which is similar to that of a wire and the diameter of which is nanometric.

Preferably, silicon nanowires have a diameter ranging from 1 nm to 100 nm, more preferentially ranging from 10 nm to 100 nm and more preferentially still ranging from 10 nm to 50 nm.

Preferably, the average diameter of the silicon nanowires ranges from 5 nm to 5 μm, more preferably from 10 nm to 50 nm.

Preferably, the average length of the silicon nanowires ranges from 50 nm to 500 nm.

Nanoworms are a particular, favourite, subgroup of nanowires characterized by their aspect ratio (the ratio of the average length to the average diameter), this aspect ratio being in the lower range of the nanowire group, namely L/D ratio is inferior or equal to 10, more preferably inferior or equal to 5, advantageously inferior or equal to 2.

According to another embodiment, the silicon particles are in the form of nano-isles. Si nano-isles are preferably obtained by a method implemented in the absence of a catalyst.

The term "nano-isles" is understood to mean, within the meaning of the invention, an element of roundish shape and the diameter of which is nanometric.

Preferably, silicon nano-isles have a diameter ranging from 1 nm to 100 nm, more preferentially ranging from 10 nm to 100 nm and more preferentially still ranging from 10 nm to 50 nm.

Preferably, the average diameter of the silicon nano-isles ranges from 5 nm to 5 μm, more preferably from 10 nm to 50 nm.

The size of the silicon material may be measured by several techniques well known by the skilled person such as for example by analysis of pictures obtained by scanning electron microscopy (SEM) from one or more samples of the carbon-silicon composite material.

Silicon particles, preferably silicon nanowires or silicon nano-isles, represent from 1% to 70% by weight of the silicon-carbon composite material, preferably from 10% to 70% by weight, more preferably from 20% to 70% by weight, even more preferably from 30% to 70% by weight, advantageously from 50% to 70% by weight.

The silicon-carbon composite material is preferably obtained in the form of a powder.

Uses of the Carbon-Silicon Composite Material

The silicon-carbon composite material according to the invention may be used as an anode active material and for the manufacture of a lithium-ion battery.

An electrode including a current collector, is prepared by a preparation method classically used in the art. For example, the anode active material consisting in the carbon-silicon composite material of the present invention is mixed with a binder, a solvent, and a conductive agent. If necessary, a dispersant may be added. The mixture is stirred to prepare a slurry. Then, the current collector is coated with the slurry and pressed to prepare the anode.

Various types of binder polymers may be used as the binder in the present invention, such as a polyvinylidene fluoride-hexafluoropropylene copolymer (PVDF-co-HEP), polyvinylidene fluoride, polyacrylonitrile, and polymethylmethacrylate.

The electrode may be used to manufacture a lithium secondary battery including a separator and an electrolyte solution which are typically used in the art and disposed between the cathode and the anode.

Experimental

Two examples of the production of silicon-carbon composite materials are given hereinafter.

The example production was performed in a hinged rotary tube furnace Nabertherm RSRB 120-750/11 equipped with a 4 L quartz tube as reactor chamber.

In both examples, the silicon-carbon composite material is obtained using silane as a silicon source and mixed with nitrogen at a silane concentration of 0.9% in volume. Nitrogen is also used alone as carrier gas when heating (steps 202, 203, 204 and 205) and cooling (steps 208 and 209) the rotating fluidized-bed reactor. Both carrier gas flow and reactive silicon-containing gas mixture flow have the value of 1 SLM. Pressure is controlled. Both productions were realized in 6 h. The rotation speed is 20 RPM, and the temperature ramp is 10° C./min to reach the temperature of 650° C. In the two examples, the micrometric graphite support in the carbon-based material of the silicon-carbon composite material is KS4 (Imerys) graphite. It is uniformly covered by catalytic nanoparticles. Operation is realized with 30 g of carbon-based material. For both examples, the targeted silicon value is 10% in mass. For both examples, the silicon nanowire diameter is between 20 and 50 nm.

Example 1 (Comparative

In this first example, the pressure $P=1.013\cdot10^5$ Pa (atmospheric pressure).

Figure 3:
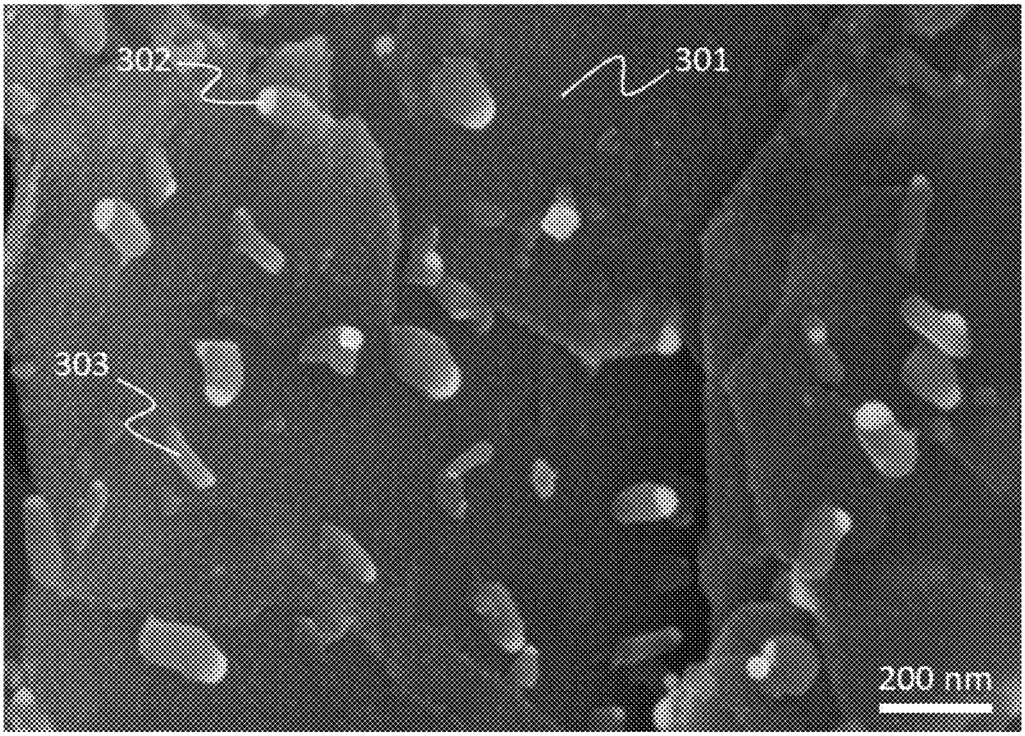
FIG. 3 is a microphotograph of a first (comparative) example of a silicon-carbon composite material microstructure, at the nanometer scale.
Figure 4:
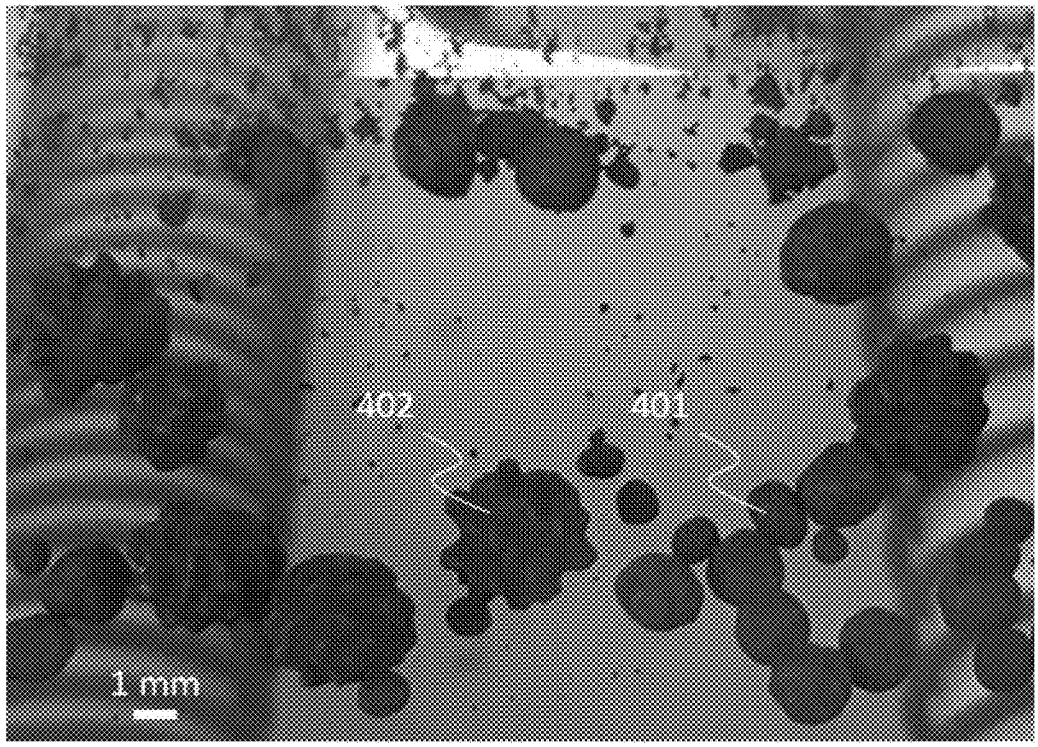
FIG. 4 is a microphotograph of a first (comparative) example of a silicon-carbon composite material microstructure, at the millimeter scale.

FIG. 3 and FIG. 4 illustrate the first example of silicon-carbon composite material. Silicon nanowires 303 are synthesized on a micrometric KS4 graphite support (30 g) 301 uniformly covered by catalytic gold nanoparticles 302. The gold/graphite mass ratio is 0.05.

Si nanowires were obtained as confirmed by MEB (FIG. 3). FIG. 4 illustrates the granulation phenomenon that occurred during the process. Spherical agglomerates 401 are present with a size ranging from 1 to 3 mm. Bigger "burr-like" agglomerates 402 are also present with a size ranging from 3 to 5 mm.

Example 2 (According to the Invention

The same following conditions as in Example 1 were implemented:

T=650° C., t=6 h, rotation 20 rpm, gas flow=1 slm both for nitrogen and nitrogen/silane mixture (silane=0.9 vol. %), powder=graphite KS4 with gold nanoparticles, same quantity KS4=30 g.

Figure 5:
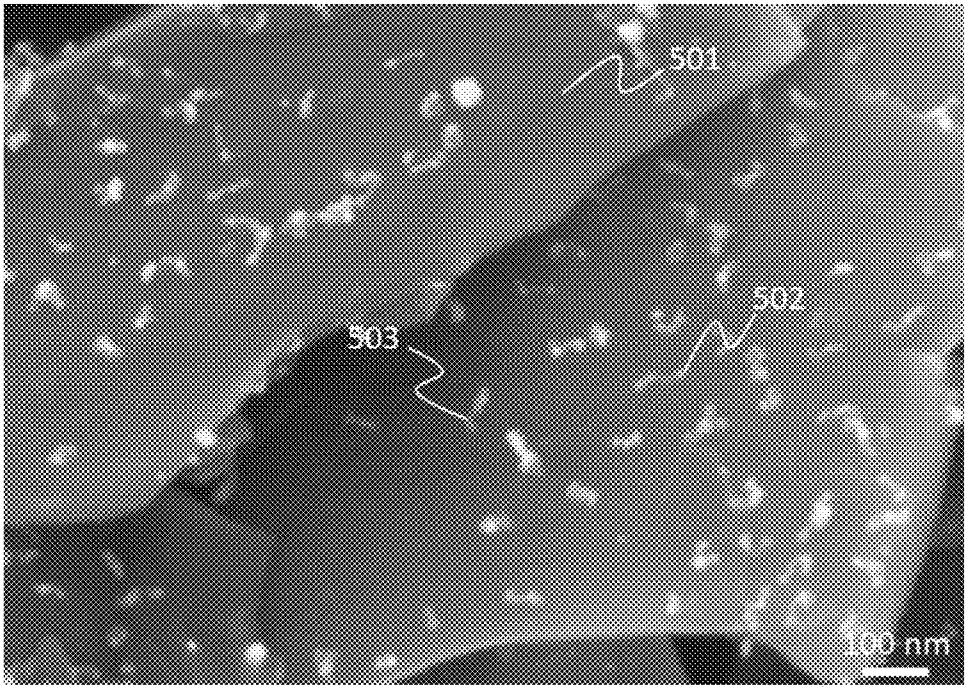
FIG. 5 is a microphotograph of the silicon-carbon composite material microstructure obtained by the method according to the invention (example 2), at the nanometer scale.
Figure 6:
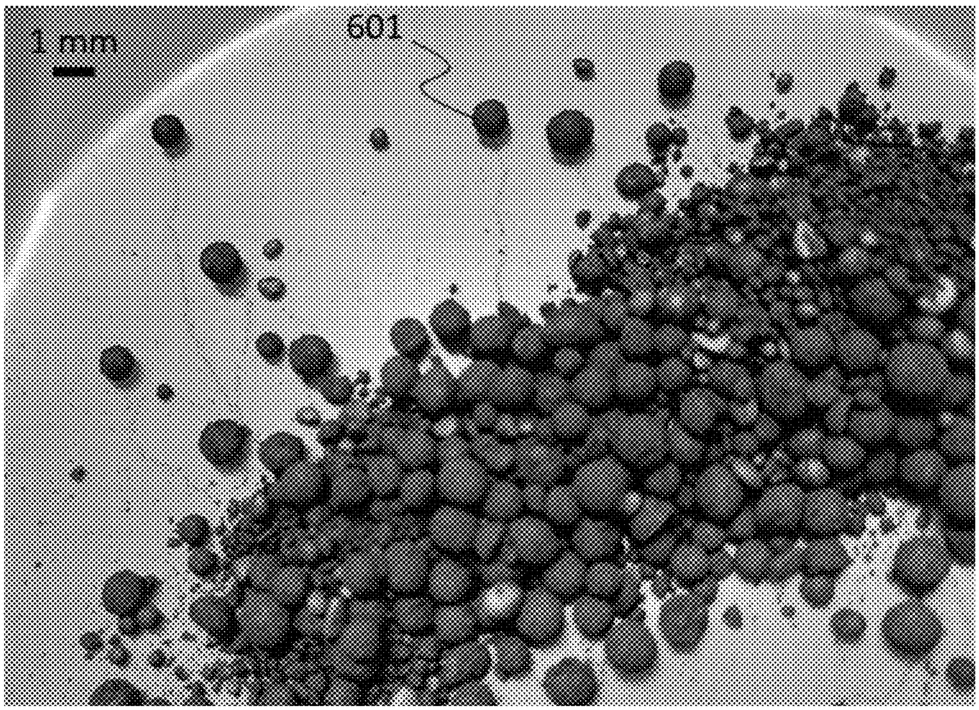
FIG. 6 is a microphotograph of a silicon-carbon composite material microstructure obtained by the method according to the invention (example 2), at the millimeter scale.

To the difference of Example 1, in Example 2, the pressure P=1.2 $10^5$ Pa. FIG. 5 illustrates the second example of silicon-carbon composite material. Silicon nanowires 503 are synthesized on a micrometric KS4 graphite support 501 uniformly covered by catalytic gold nanoparticles 502. The gold/graphite mass ratio is 0.05. Si nanowires were obtained as confirmed by MEB (FIG. 5). Estimated diameter: 50-100 nm. Estimated length: 100 nm. FIG. 6 illustrates the second example of silicon-carbon composite material. On this microphotograph, one can note the granulation phenomenon that occurred during the process. Spherical agglomerates 601 are present with a size ranging from 1 to 3 mm.

| Results | |
|---|---|
| | Composite yield (%) |
| Ex1 | 29.9 |
| Ex 2 | 90.9 |

The comparison demonstrates that the composite is obtained with increased yield when the process is implemented according to the claimed parameters.

The invention claimed is:

1. A process for the preparation of a carbon-silicon composite material, wherein the process is implemented in a tubular chamber of a reactor, wherein the tubular chamber is capable of rotating around its longitudinal axis (X-X), the process comprising:

(1) introducing into the tubular chamber at least a carbon-based material, comprising a carbon support and optionally a catalyst,
(2) heating the tubular chamber under carrier gas flow,
(3) rotating the tubular chamber,
(4) introducing a reactive silicon-containing gas mixture into the rotating tubular chamber,
(5) applying a thermal treatment at a temperature ranging from 200° C. to 900° C., and a pressure superior or equal to 1.02.10" Pa, under reactive silicon-containing gas mixture flow, in the rotating tubular chamber,
(6) recovering the obtained product,
lit being understood that step (3) can start before or after step (1) or step (2).

2. The process according to claim 1, wherein the pressure at step (5) is from $1.05 \cdot 10^5$ to $10^6$ Pa.

3. The process according to claim 1, wherein the temperature at step (5) ranges from 350° C. to 850° C.

4. The process according to claim 1, wherein the carbon-based material is selected from graphite, graphene, and carbon.

5. The process according to claim 4, wherein the carbon-based material is graphite powder with a mean particle size from 0.01 to 50 μm.

6. The process according to claim 1, wherein the carbon-based material bears catalyst particles on its surface.

7. The process according to claim 1, wherein the catalyst is selected from metals, bimetallic compounds, metallic oxides, metallic nitrides, metallic salts and metallic sulphides.

8. The process according to claim 1, wherein the reactive silicon-containing gas mixture flow comprises at least a reactive silicon species and a carrier gas.

9. The process according to claim 1, wherein the reactive silicon species is selected from silane compounds.

10. The process according to claim 9, wherein the reactive silicon species is silane $SiH_4$.

11. The process according to claim 1, wherein the ratio by volume of the carbon-based material, including the carbon support and optionally the catalyst, based on the volume of the tubular chamber, is from 10% to 60%.

12. The process according to claim 1, wherein at step (5), the reactive silicon-containing gas mixture flow ranges from 0.1 to 50 SLM (Standard Liter per Minute).

13. The process according to claim 1, wherein the rotation speed of the tubular chamber ranges from 1 to 40 RPM (Revolutions Per Minute).

14. The process according to claim 1, wherein it comprises, after stage (6), the application of at least one cycle as follows:

(1') Reloading fresh carbon-based material into the tubular chamber,
(2') heating the tubular chamber under carrier gas flow,
(3') rotating the tubular chamber,
(4') introducing a reactive silicon-containing gas mixture into the rotating tubular chamber,
(5') applying a thermal treatment at a temperature ranging from 200° C. to 900° C., and a pressure superior or equal to $1.02 \cdot 10^5$ Pa, under reactive silicon-containing gas mixture flow, in the rotating tubular chamber,
(6') recovering the obtained product.

15. The process according to claim 1, wherein the carbon-silicon composite material comprises a carbon-based material and a nanometric silicon material.

16. The process according to claim 15, wherein the nanometric silicon material is nanowires or nano-isles.

17. A method of making an electrode including a current collector, the method comprising (i) implementing the method according to claim 1 for preparing a carbon-silicon composite material, and (ii) covering at least one surface of the current collector with a composition comprising the carbon-silicon composite material, as an electrode active material.

18. A method of making an energy storage device, including a cathode, an anode, and a separator disposed between the cathode and the anode, wherein the method comprises implementing the method of claim 17 for making at least one of the electrodes.

19. The method of claim 18, wherein the energy storage device is a lithium secondary battery.

* * * * *